United States Patent
Hogue

(10) Patent No.: US 6,845,919 B1
(45) Date of Patent: Jan. 25, 2005

(54) APPARATUS FOR DISTURBING AND REMOVING ELECTRONS AND PROTONS FROM THE ATMOSPHERE

(75) Inventor: John Hogue, Flint, MI (US)

(73) Assignee: Hogue Family Foundation, Plint, ME (US)

( * ) Notice: Subject to any disclaimer, the term of this patent is extended or adjusted under 35 U.S.C. 154(b) by 308 days.

(21) Appl. No.: 09/710,899

(22) Filed: Nov. 14, 2000

Related U.S. Application Data

(63) Continuation-in-part of application No. 08/421,292, filed on Apr. 13, 1995, now abandoned, which is a continuation of application No. 07/985,340, filed on Dec. 4, 1992, now abandoned.

(51) Int. Cl.[7] .............................................. A01G 15/00
(52) U.S. Cl. ...................... 239/14.1; 239/2.1; 361/117; 174/2
(58) Field of Search ................................ 239/2.1, 14.1; 361/111, 117; 174/2, 3, 6

(56) References Cited

U.S. PATENT DOCUMENTS

| | | | | |
|---|---|---|---|---|
| 1,869,661 A | * | 8/1932 | Bumbaugh ..................... | 174/2 |
| 4,540,844 A | * | 9/1985 | Sautereau et al. ............. | 174/3 |
| 4,605,814 A | * | 8/1986 | Gillem ........................... | 174/2 |
| 5,043,527 A | * | 8/1991 | Carpenter, Jr. ................. | 174/2 |

* cited by examiner

Primary Examiner—Robin O. Evans
(74) Attorney, Agent, or Firm—Brooks Kushman P.C.

(57) ABSTRACT

A tower has a concrete base (14) supported within the Earth and a frame (5) extending vertically from the base into the atmosphere. A ground conductor (12) runs alongside the frame. A first ground rod (10) is driven into the Earth and is connected to the ground conductor to charge the ground conductor electrically negative. A second ground rod (10) extending vertically above the frame is connected to the ground conductor to be charged electrically negative. A positive conductor (21) running alongside the frame is connected to a positively charged generator (16). A positive rod (22) extending vertically above the frame is connected to the positive conductor to be charged electrically positive. The second ground rod discharges protons from lightning into the Earth via the ground conductor and the first ground rod, and the positive rod attracts and discharges electrons remaining its vicinity into the generator via the positive conductor.

2 Claims, 2 Drawing Sheets

APPARATUS FOR DISTURBING AND REMOVING ELECTRONS AND PROTONS FROM THE ATMOSPHERE

CROSS-REFERENCE TO RELATED APPLICATIONS

This application is a continuation-in-part of U.S. application Ser. No. 08/421,292, filed on Apr. 13, 1995, abandoned on May 19, 2001, which was a continuation of U.S. application Ser. No. 07/985,340, filed on Dec. 4, 1992, abandoned on Apr. 13, 1995, the disclosures of which are both hereby incorporated by reference in their entirety.

BACKGROUND OF THE INVENTION

This invention relates to a system to reduce tornadoes, hurricanes, typhoons, sheer winds, lightning strikes, forest fires and problems caused by lightning being uncontrolled. Water can be taken out of the hurricanes and other storms. Storms and hurricanes can be rerouted to places where there is less damage to property and human lives. Clean the air up, reduce crime and extend human lives. We are what we eat, we also react to the air we breath. The earth is floating in a magnetic field created by the more negative charged Earth and the positive charged ionosphere. The ozone layer keeps the ionosphere from coming down on us. We have upset the balance; we have to push the ionosphere back up where it belongs. Where God intended it to be. Any person with knowledge of electrical engineering will have no problem understanding this invention.

SUMMARY OF THE INVENTION

Adding to the previous application filed, one-embodiment uses a lightning striking tower self contained. One tower could be used to control a sizeable farm chance of being hit by lightning. Several towers would stop forest fires by using a plural number of towers properly spaced across the Rocky Mountains and the Sequoia National Forest; anywhere lightning may strike. Build a tower with more attraction for the protons than the surrounding trees, houses, and cities. Golf courses with one tower at one end of the course with necessary height will solve the above problem. The towers will need good ground for the ground rods, sand makes poor ground. Several ground rods may be needed. In the mountain holes will have to be blasted and clay or another soil that holds moisture will be needed. A windmill, battery, generator and rectifier to satisfy the Federal Aviation Association. The Federal Aviation Association will probably specify what is needed on all towers. That is the purpose of having the equipment to run the light on the tower. The speaker blast will push the air molecules back in all directions and when the air is pushed back air will reform coming from all directions making a small part of the hurricane or other storms to come to a near stop. A plural number of speakers will have a big influence on the strength of the wind and rain and the direction it will keep going. A large speaker acts like a small bomb blast. The striking cylinder could be activated by a powder charge, a magnetic coil; this illustration is using a spring. The tower will save thousands of lives, trillions of dollars in property damage, make people more at ease and healthier. From now until the world comes to an end, this invention will allow God to make the final decisions, not man.

Another embodiment will add a generator on the ground near the tower with a rectifier for positive (protons) to charge the second cable to discharge the electrons. A switching arrangement and current meters will be needed to throw the automatic switch to properly charge the second cable. In remote places a natural gas or diesel, regular gas generator will be needed. It is possible that the switching will not be needed if the protons will hit the negative ground rod with the positive charged cable close by.

Another embodiment with all the equipment in the two embodiments above in place and working add a double switching arrangement that through the meter disconnects the ground rod and the generator from the cables. Add a switch to connect a battery, positive terminal ground rod cable, the negative terminal to the positive cable. This arrangement will allow the dielectric field to take over and charge the battery.

Another embodiment is a huge speaker with a windmill to run a generator rectifier which will charge the batteries to make this rascal of a speaker self contained. The cylinder that strikes the large button in the speaker is a spring-loaded; (magnet coil loaded would work). The cylinder has gears on it, the gears on the DC motor driver gear has sufficient teeth to pull the cylinder back against the spring thruster, then the round motor driven gear has a number of teeth missing, this allows the cylinder to plunge forward, striking this button. The humongous speaker will rattle the elements hurricane winds. The wheel with gears on it can be made to blast then with a few teeth out, in a few seconds it will blast again, and will continue to blast until it is automatically turned off. The speaker will need an automatic transmitter and receiver warning light.

DETAILED DESCRIPTION OF THE INVENTION

Figure 1:
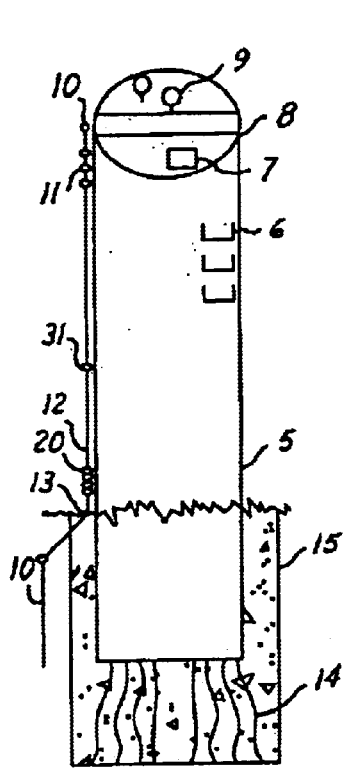
FIG. 1: is a tower supporting the grounded cable, the windmill rectifier 4, electrical generator and all apparatus to make the tower discharge lighting protons (+). Cable could be from 2/0 size insulated from 600 volts to 40,000 volts.

FIG. 1: is the lightning striking tower. The tower includes a frame 5 and steps 6 to climb the tower. The tower also includes a housing for the generator 7, and a rectifier 8. Light aids 9 are at the top of the tower platform looking down. A ground conductor 12 running alongside the tower is connected at one end to a first ground rod 10 running alongside the tower and is connected at another end to a second ground rod or rods 10 extending from the base of tower 5 into Earth 13 with concrete 14 or other supporting materials insulating the second ground rods 10 from the outer edge of tower base 15.

Figure 2:
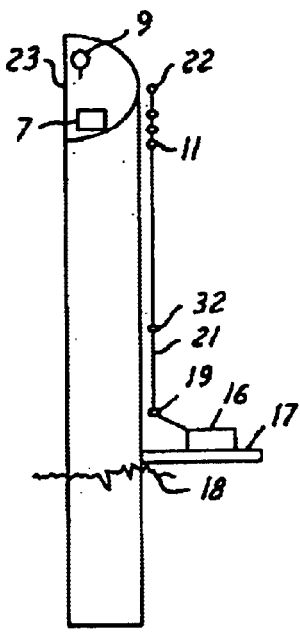
FIG. 2: is the other side of FIG. 1. This equipment will be needed to discharge the electrons.

FIG. 2: is the outer half of the tower. An enclosure 16 houses generator rectifier switches and sits on a base 17 seated on a surface 18 of Earth. Positive current motor 19 and negative current meter 20 are associated with positive conductor 21 and positive conductor 22. Line 23 shows the other side of tower when electrons are discharged.

Figure 3:
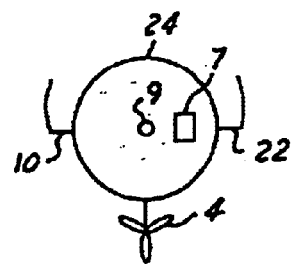
FIG. 3: is the top of the tower looking down.

FIG. 3: is the top of the tower 24 with positive ground rod 22 and the negative ground rod 10. The tower platform being insulated and having rails to protect the maintenance people on top of the tower platform.

Figure 3A:
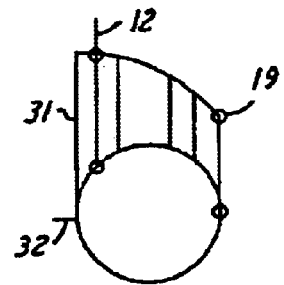
FIG. 3A: is the top of the tower showing safety rails.

FIG. 3A: top of the tower with rails 31 for the safety of the maintenance of the tower platform 32.

Figure 4:
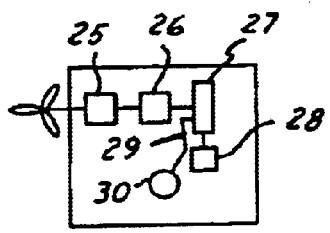
FIG. 4: is the block diagram showing the windmill connected to the generator rectifier and switches on top of the tower.

FIG. 4: block diagram of the equipment on top of the tower platform on top of the tower which includes a generator 25, a switch and current breaker 26, a rectifier 27, a battery 28, and a switch 29 for light 30 to light.

Figure 5:
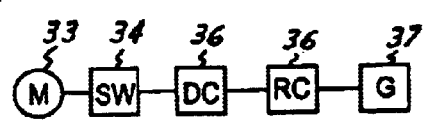
FIG. 5: is a block diagram showing the switches, generator and rectifier to make the negative cable discharge the protons (+) all necessary equipment is in this package.

FIG. 5: the packaging unit housing for all the equipment at the foot of the tower, consisting of meters 33, switches 34, switch panels 35, and rectifiers 36 to charge AC to DC gas generator 37 where electricity is available.

Figure 6:
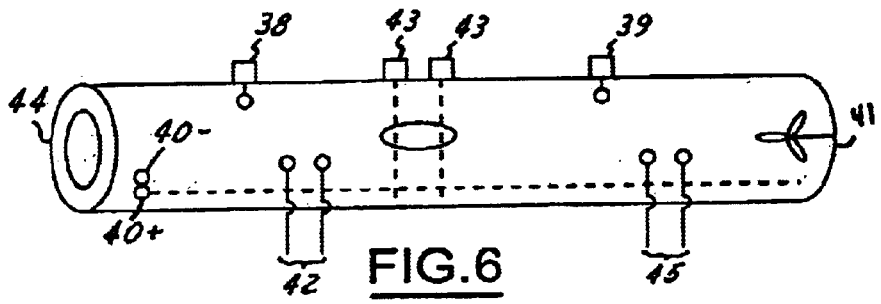
FIG. 6: is an experimental tank to do many experiments, a sphere or other shapes will work.

FIG. 6: experimental tank 44 with lights 38 and 39. Inside of tank 44 includes a positive probe 40. A fan 41 is inside of tank 44. Tank 44 further includes a magnifying glass 42, outlet 43 to pump ions in tank 44, a magnifying glass 45, and outlet 43 to pump gasses into the tank such as freon; ions.

Figure 7:
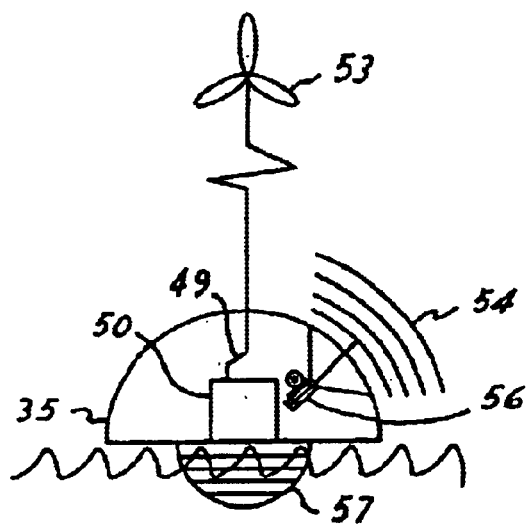
FIG. 7: is a whopper of a speaker and housing, weather proof with a windmill.

FIG. 7: a large speaker 55 having a radio or sonar antenna 49. A housing 50 houses the equipment to make the speaker work. A shaft transfers the power from the windmill 53 to a generator. A water proof antenna for the radio equipment starts and stops the speaker. The speaker 55 is directed towards clouds 54 and has a housing 56 for the striking cylinder spring and gears to make the speaker blast keel 57 of the speaker and weight to help stabilize the speaker.

Figure 7A:
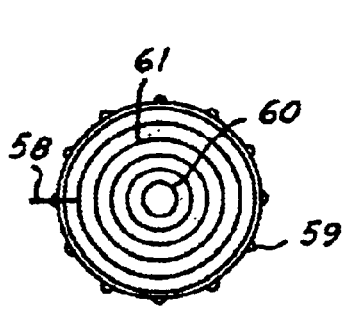
FIG. 7A: is the speaker cone.
Figure 7B:
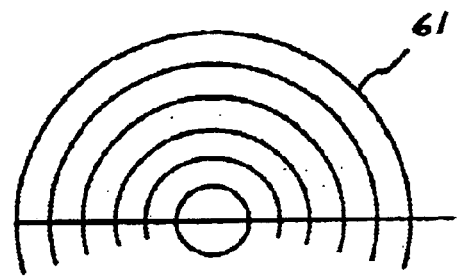
FIG. 7B: is 60% of a full round speaker, one suited to stop a portion of the hurricane or other weather problems.

FIG. 7A: speaker cone 58 of corrugated speaker with bolts 59 to anchor speaker cone 60 and speaker buttons 61. When replacing bolts with suitable springs the one would not have to be corrugated.

Figure 8:
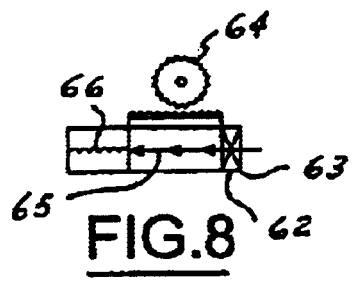
FIG. 8: is the gearbox, the spring cylinder shows the gears and the spring that drives the plunger.

FIG. 8: inside the gearbox includes speaker button 62 and weather proof housing 63. Movement of gear 64 to load spring 65 with weather proof seal (o ring) causes spring 66 to push the cylinder against the speaker button. Gears 67 are made to let the speaker blast in intervals.

Figure 9:
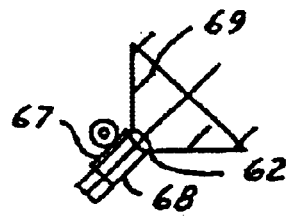
FIG. 9: shows the rear of the speaker the plunger protruding through the housing.

FIG. 9: non-corrugated speaker with gears 67 on wheel and plunger cylinder and springs 68 to allow non corrugated 69.

Having described my invention I claim:

1. A system for attracting and discharging electrons and protons from the atmosphere above the surface of the Earth, the system comprising:

a tower having a concrete base (14) supported within the surface (18) of the Earth (13), the tower further having a frame (5) extending vertically from the concrete base (14) into the atmosphere above the surface of the Earth, the concrete base (14) electrically insulating the tower frame (5) from the Earth;

a ground conductor (12) running alongside the tower frame (5) into the atmosphere above the surface of the Earth, the ground conductor (12) being electrically insulated from the tower frame (5):

a first ground rod (10) driven into the surface of the Earth, one end of the first ground rod (10) being connected to a first end of the ground conductor (12) to thereby charge the ground conductor (12) electrically negative:

a second ground rod (10) connected to a second end of the ground conductor (12) to be charged electrically negative, the second ground rod (10) extending into the atmosphere above the tower frame (5):

a generator (16) for supplying positively charged electricity:

a positive conductor (21) running alongside the tower frame (5) into the atmosphere above the surface of the Earth, the positive conductor (21) being connected at a first end to the generator (16) to be charged electrically positive, the positive conductor (21) being electrically insulated from the tower frame (5);

a positive conductor rod (22) connected to a second end of the positive conductor (21) to be charged electrically positive, the positive conductor rod (22) extending into the atmosphere above the tower frame (5);

wherein when lightning from the atmosphere strikes the second ground rod (10), the second ground rod (10) discharges protons from the lightning into the Earth via the ground conductor (12) and the first ground rod (10), and the positive conductor rod (22) attracts electrons remaining its vicinity and discharges the attracted electrons into the generator (16) via the positive conductor (21).

2. The system of claim 1 wherein:

when wind of the atmosphere blows past the frame tower (5), the second ground rod (10) attracts protons from the wind and discharges the attracted protons into the Earth via the ground conductor (12) and the first ground rod (10), and the positive conductor rod (22) attracts electrons remaining its vicinity and discharges the attracted electrons into the generator (16) via the positive conductor (21).

\* \* \* \* \*

UNITED STATES PATENT AND TRADEMARK OFFICE
CERTIFICATE OF CORRECTION

PATENT NO.     : 6,845,919 B1
DATED          : January 25, 2005
INVENTOR(S)    : John Hogue It is certified that error appears in the above-identified patent and that said Letters Patent is hereby corrected as shown below:

Title page,
Item [73], Assignee, "Hogue Family Foundation, Plint, ME (US)", should read
-- Hogue Family Foundation, Flint, MI (US) --.

Signed and Sealed this

Tenth Day of January, 2006

JON W. DUDAS
*Director of the United States Patent and Trademark Office*